United States Patent
Urano et al.

(10) Patent No.: US 12,103,565 B2
(45) Date of Patent: Oct. 1, 2024

(54) AUTONOMOUS VEHICLE DRIVING DEVICE FOR MANAGING POWER SAVING STATE, AUTONOMOUS VEHICLE DRIVING METHOD FOR MANAGING POWER SAVING STATE, AND PLURALITY OF NON-TRANSITORY STORAGE MEDIA FOR MANAGING POWER SAVING STATE

(71) Applicant: TOYOTA JIDOSHA KABUSHIKI KAISHA, Toyota (JP)

(72) Inventors: Hiromitsu Urano, Numazu (JP); Sho Otaki, Yokohama (JP); Takashi Suzuki, Susono (JP); Toru Takashima, Susono (JP); Hojung Jung, Shizuoka-ken (JP); Hiromitsu Kobayashi, Nisshin (JP); Satoru Niwa, Shizuoka-ken (JP); Kosuke Akatsuka, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 283 days.

(21) Appl. No.: 17/696,202

(22) Filed: Mar. 16, 2022

(65) Prior Publication Data
US 2022/0297722 A1    Sep. 22, 2022

(30) Foreign Application Priority Data
Mar. 18, 2021 (JP) ................ 2021-044990

(51) Int. Cl.
*B60W 60/00*    (2020.01)
*B60W 20/13*    (2016.01)
*B60W 20/20*    (2016.01)
*G05D 1/227*    (2024.01)
*G06F 1/3287*   (2019.01)
*G07C 5/00*     (2006.01)

(52) U.S. Cl.
CPC .......... *B60W 60/005* (2020.02); *B60W 20/13* (2016.01); *B60W 20/20* (2013.01); *G05D 1/227* (2024.01); *G06F 1/3287* (2013.01); *G07C 5/008* (2013.01); *B60W 2510/08* (2013.01)

(58) Field of Classification Search
None
See application file for complete search history.

(56) References Cited

U.S. PATENT DOCUMENTS

| | | | |
|---|---|---|---|
| 10,717,448 B1 * | 7/2020 | Seo ................ | H04W 4/44 |
| 2020/0047773 A1 | 2/2020 | Akaba et al. | |
| 2022/0011768 A1 | 1/2022 | Matsunaga et al. | |
| 2022/0219629 A1 * | 7/2022 | Suenaga ........... | G06F 1/3206 |

FOREIGN PATENT DOCUMENTS

| | | |
|---|---|---|
| JP | 2018-077649 A | 5/2018 |
| JP | 2020-126534 A | 8/2020 |
| WO | 2020/202380 A1 | 10/2020 |

* cited by examiner

*Primary Examiner* — Todd Melton
(74) *Attorney, Agent, or Firm* — Dinsmore & Shohl LLP (57) ABSTRACT

An autonomous driving device to be mounted on a vehicle includes a first ECU configured to autonomously drive the vehicle, and a second ECU configured to operate the vehicle under remote control from an outside. The first ECU is configured to keep an activated state while the second ECU is operating the vehicle. The second ECU is configured to keep a power saving state while the first ECU is autonomously driving the vehicle.

18 Claims, 6 Drawing Sheets

AUTONOMOUS VEHICLE DRIVING DEVICE FOR MANAGING POWER SAVING STATE, AUTONOMOUS VEHICLE DRIVING METHOD FOR MANAGING POWER SAVING STATE, AND PLURALITY OF NON-TRANSITORY STORAGE MEDIA FOR MANAGING POWER SAVING STATE

CROSS-REFERENCE TO RELATED APPLICATION

This application claims priority to Japanese Patent Application No. 2021-044990 filed on Mar. 18, 2021, incorporated herein by reference in its entirety.

BACKGROUND

1. Technical Field

The present disclosure relates to an autonomous driving device, an autonomous driving method, and a plurality of non-transitory storage media.

2. Description of Related Art

Japanese Unexamined Patent Application Publication No. 2018-077649 (JP 2018-077649 A) discloses a technology relating to remote control on an autonomous driving vehicle. According to this technology, when autonomous driving is difficult, the vehicle and remote control management equipment communicate with each other to remotely drive the vehicle by a remote operator.

SUMMARY

As a method for implementing autonomous driving and remote control in one vehicle, an electronic control unit (ECU) for autonomous driving and an ECU for remote control may be mounted separately. There is also a method that involves operating an application for autonomous driving and an application for remote control on one ECU. In the latter method, however, each application consumes a large amount of computational resources, which imposes a high load on the ECU. Therefore, a high-performance ECU is required, which leads to an increase in costs. When the ECU goes down in the latter case, neither the autonomous driving nor the remote control can be performed. That is, the former method is realistic from the viewpoint of costs and fail-safe.

In autonomous driving vehicles including electric vehicles (EVs) and plug-in hybrid vehicles (PHVs), further power saving is demanded to reduce battery consumptions and extend cruising ranges. Since ECUs consume electric power, the power consumption as a whole increases along with an increase in the number of mounted ECUs. Therefore, when the ECU for autonomous driving and the ECU for remote control are mounted separately, some ingenuity is required to reduce the power consumption.

The present disclosure provides a technology capable of reducing power consumptions of ECUs in a vehicle capable of autonomous driving and remote control.

A first aspect of the present disclosure relates to an autonomous driving device to be mounted on a vehicle. The autonomous driving device includes a first ECU configured to autonomously drive the vehicle, and a second ECU configured to operate the vehicle under remote control from an outside. The first ECU is configured to keep an activated state while the second ECU is operating the vehicle. The second ECU is configured to keep a power saving state while the first ECU is autonomously driving the vehicle.

In the first aspect, the second ECU may be configured to make transition from the power saving state to an activated state in response to an activation instruction from the first ECU, and make transition from the activated state to the power saving state in response to a power saving instruction from the first ECU.

In the first aspect, the autonomous driving device may further include a third ECU configured to arbitrate control information to be output from the first ECU and control information to be output from the second ECU when the remote control is switched to autonomous driving or the autonomous driving is switched to the remote control.

A second aspect of the present disclosure relates to an autonomous driving method for autonomously driving a vehicle by at least two ECUs. The autonomous driving method includes autonomously driving the vehicle by a first ECU, operating the vehicle under remote control from an outside by a second ECU, keeping the first ECU in an activated state while the second ECU is operating the vehicle, and keeping the second ECU in a power saving state while the first ECU is autonomously driving the vehicle.

In the second aspect, the autonomous driving method may further include making transition of the second ECU from the power saving state to an activated state in response to an activation instruction from the first ECU, and making transition of the second ECU from the activated state to the power saving state in response to a power saving instruction from the first ECU.

In the second aspect, the autonomous driving method may further include arbitrating, by a third ECU, control information to be output from the first ECU and control information to be output from the second ECU when the remote control is switched to autonomous driving or the autonomous driving is switched to the remote control.

A third aspect of the present disclosure relates to a plurality of non-transitory storage media. The non-transitory storage media include a first non-transitory storage medium storing instructions that are executable by a first ECU mounted on a vehicle and that cause the first ECU to perform a first function, and a second non-transitory storage medium storing instructions that are executable by a second ECU mounted on the vehicle and that cause the second ECU to perform a second function. The first function includes autonomously driving the vehicle, and keeping the first ECU in an activated state while the second ECU is operating the vehicle. The second function includes operating the vehicle under remote control from an outside, and keeping the second ECU in a power saving state while the first ECU is autonomously driving the vehicle.

In the third aspect, the first function may include outputting an activation instruction to the second ECU, and outputting a power saving instruction to the second ECU. The second function may include making transition from the power saving state to an activated state in response to the activation instruction from the first ECU, and making transition from the activated state to the power saving state in response to the power saving instruction from the first ECU.

In the third aspect, the non-transitory storage media may further include a third non-transitory storage medium storing instructions that are executable by a third ECU and that cause the third ECU to arbitrate control information to be output from the first ECU and control information to be output from the second ECU when the remote control is switched to autonomous driving or the autonomous driving is switched to the remote control.

According to the first aspect, the second aspect, and the third aspect of the present disclosure, the power consumptions of the ECUs can be reduced by keeping the second ECU in the power saving state while the first ECU is autonomously driving the vehicle. The first ECU is kept in the activated state while the second ECU is operating the vehicle. Thus, it is possible to quickly switch the remote control to the autonomous driving when the autonomous driving is possible or the remote control is difficult.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below with reference to the drawings. When the number, quantity, amount, range, and other numerals of each element are mentioned in the embodiment below, the technical idea of the present disclosure is not limited to the numerals mentioned herein except for a case where the numerals are explicitly stated or clearly specified in principle. The structures and the like described in the embodiment below are not necessary to the technical idea of the present disclosure except for a case where the structures are explicitly stated or clearly specified in principle.

1. SCHEMATIC CONFIGURATION OF REMOTE CONTROL SYSTEM

Figure 1:
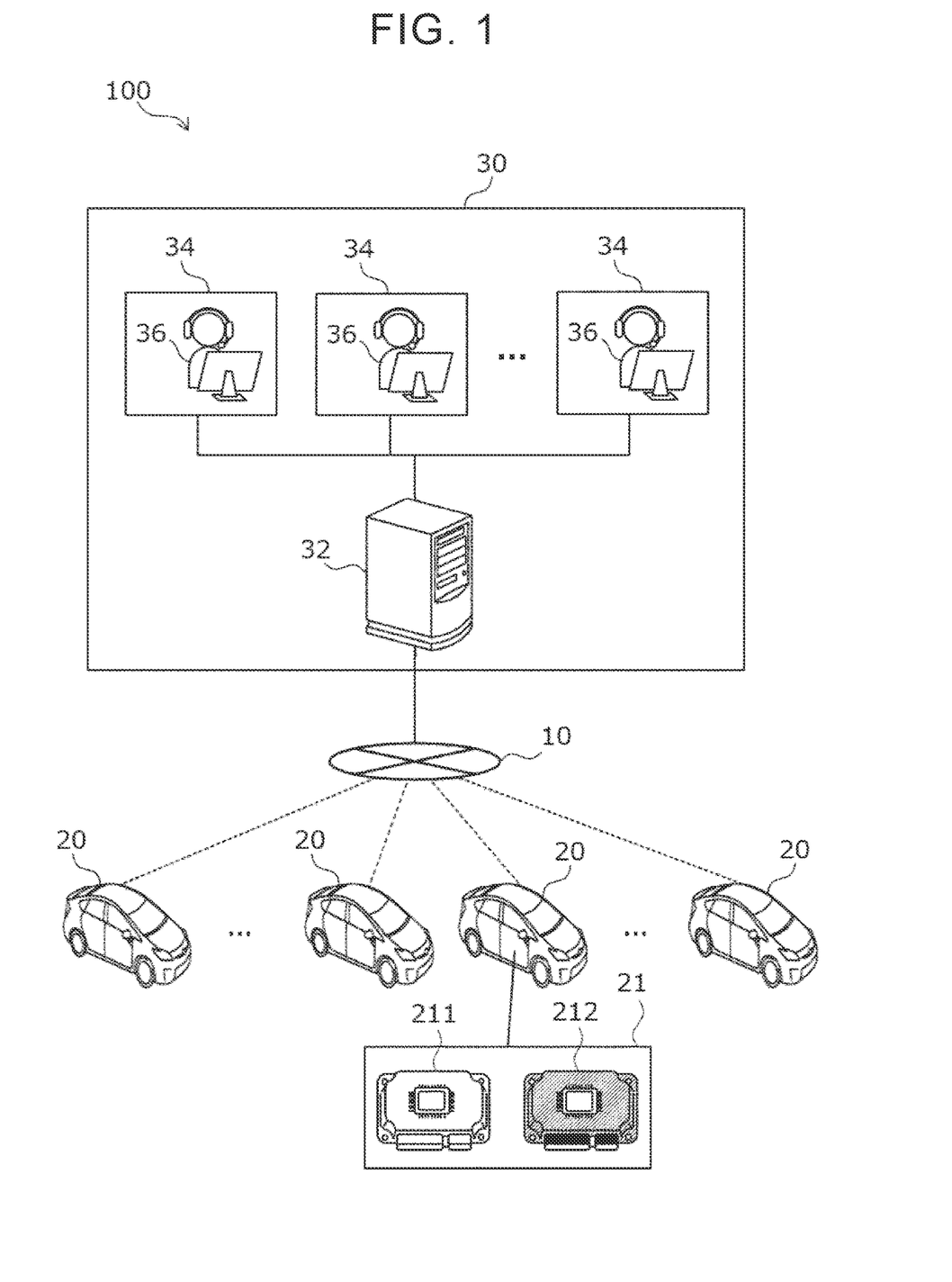
FIG. 1 is a diagram schematically illustrating a configuration of a remote control system using autonomous driving vehicles according to an embodiment of the present disclosure.

FIG. 1 is a diagram schematically illustrating a configuration of a remote control system common to the present embodiment. A remote control system 100 is a system for remotely controlling autonomous driving vehicles 20 from a remote control center 30. For example, the autonomous driving level of each autonomous driving vehicle 20 may be Level 4 or Level 5. The autonomous driving vehicle 20 is hereinafter referred to simply as "vehicle 20". The vehicle 20 includes an autonomous driving device 21. The autonomous driving device 21 includes a first electronic control unit (ECU) 211 that autonomously drives the vehicle, and a second ECU 212 that operates the vehicle 20 under remote control from the outside. The first ECU 211 for autonomous driving is hereinafter referred to as "autonomous driving ECU 211". The second ECU 212 for remote control is hereinafter referred to as "remote control ECU 212".

The remote control in the present disclosure includes remote assistance and remote driving. The remote assistance and the remote driving are performed by a remote operator 36 based on a request from the vehicle 20 when the vehicle 20 has difficulty or is expected to have difficulty in continuing the autonomous driving.

In the remote assistance, the remote operator 36 makes a part of determination for the autonomous driving of the vehicle 20. Basic calculations related to recognition, determination, and operation required for driving are performed in the vehicle 20. The remote operator 36 determines an action to be taken by the vehicle 20 based on information transmitted from the vehicle 20, and instructs the vehicle 20 to take the action. The remote assistance instruction to be sent from the remote operator 36 to the vehicle 20 includes an instruction to advance the vehicle 20 and an instruction to stop the vehicle 20. The remote assistance instruction may further include an instruction for offset avoidance of an obstacle ahead, an instruction to overtake a preceding vehicle, and an instruction for emergency evacuation.

In the remote driving, the remote operator 36 performs at least a part of the driving of the vehicle 20, specifically, a steering operation or an acceleration/deceleration operation. In the remote driving, the recognition, determination, and operation required for driving are performed by the remote operator 36. The remote operator 36 drives the vehicle 20 from a remote place in the same manner as the driving at a driver's seat of the vehicle 20. In the remote driving, the remote operator 36 need not always perform all the recognition, determination, and operation. At least a part of the recognition, determination, and operation may be assisted by functions of the vehicle 20.

A server 32 and remote control terminals 34 are provided in the remote control center 30. The vehicles 20 are connected to the server 32 via a communication network 10 including 4th Generation (4G) and 5th Generation (5G). The number of vehicles 20 communicable with the server 32 is one or more. The server 32 receives a remote control request issued from any vehicle 20. The server 32 selects a remote operator 36 to respond to the remote control request based on details of the request (for example, a remote assistance request or a remote driving request).

The remote control terminal 34 is an interface (human machine interface (HMI)) for the remote control by the remote operator 36. The remote control terminal 34 includes an information output unit that outputs, to the remote operator 36, information necessary for the remote control on the vehicle 20, and an operation input unit that inputs operations for the remote control by the remote operator 36. Examples of the information output unit include a display that outputs images captured by a camera of the vehicle 20, and a loudspeaker that outputs sounds collected by a microphone of the vehicle 20. Examples of an operation input unit for remote assistance include buttons, levers, and a touch panel. Examples of an operation input unit for remote driving include a steering wheel, an accelerator pedal, a brake pedal, an operation lever of a turn signal, and an operation lever of a wiper. Separate terminals or a common terminal may serve as the remote control terminal 34 for remote driving and the remote control terminal 34 for remote assistance. At least one remote control terminal 34, or a plurality of remote control terminals 34, is provided. At the remote control center 30, remote operators 36 as many as the remote control terminals 34 are on standby.

Each remote control terminal 34 is connected to the server 32 via a communication network including a local area network (LAN) and the Internet. The remote control center 30 need not be a real facility. The system in which the remote control terminals 34 are connected to the server 32 via the communication network is referred to as "remote control center 30". Therefore, the server 32 may be provided on a cloud, and the remote control terminals 34 may be provided at satellite offices in various places or homes of the remote operators 36.

2. OUTLINE OF OPERATIONS OF AUTONOMOUS DRIVING DEVICE

Figure 2:
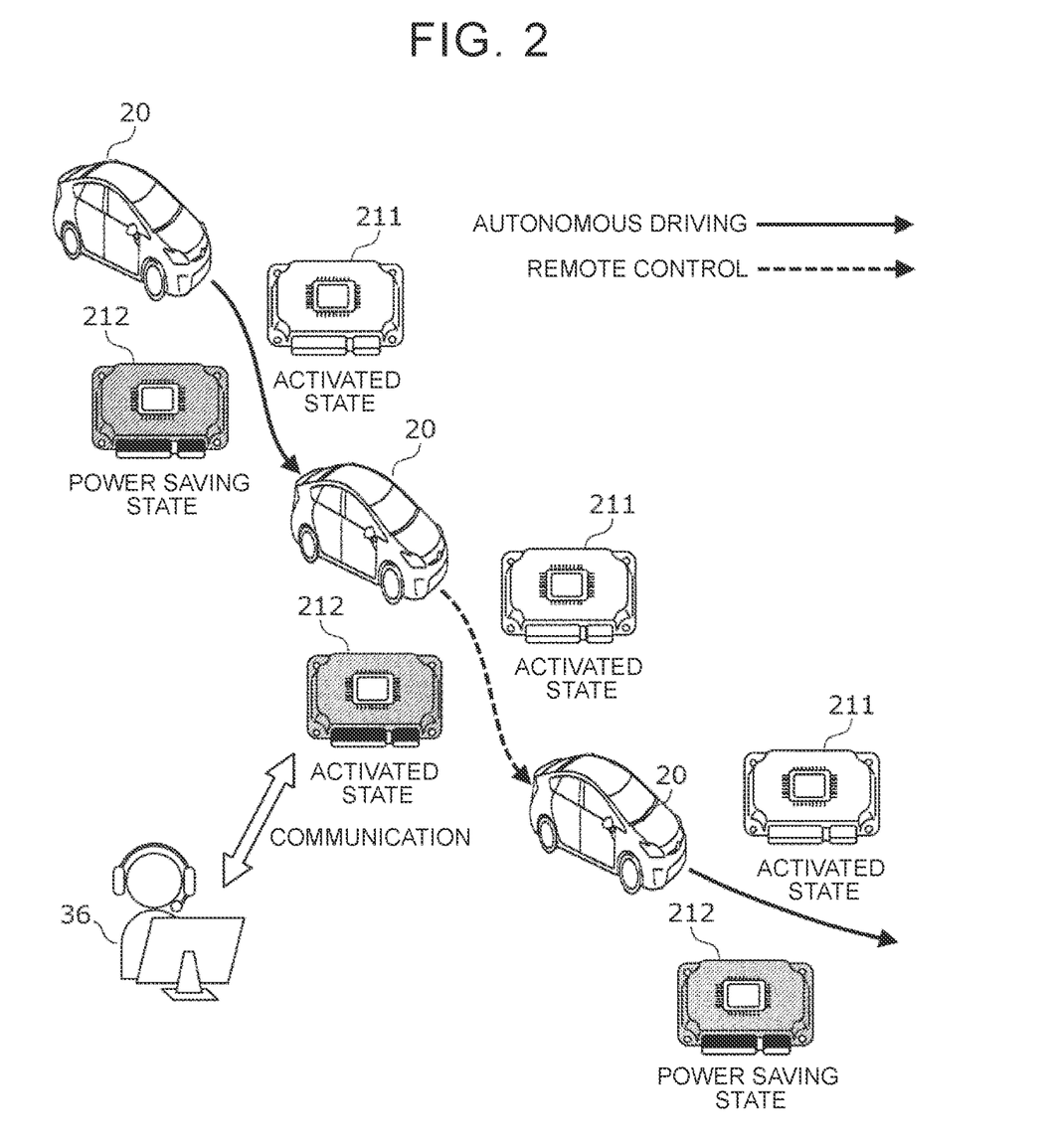
FIG. 2 is a diagram illustrating an outline of operations of an autonomous driving device according to the embodiment of the present disclosure.

FIG. 2 is a diagram illustrating an outline of operations of the autonomous driving device 21. In FIG. 2, arrow lines represent statuses of control on the vehicle 20 by the autonomous driving device 21. A travel path of the vehicle 20 represented by a continuous arrow line indicates that the vehicle 20 is driven autonomously. A travel path of the vehicle 20 represented by a dotted arrow line indicates that the vehicle 20 is controlled remotely.

The autonomous driving of the vehicle 20 is performed by the autonomous driving ECU 211. The autonomous driving ECU 211 is kept in an activated state during the autonomous driving. Since the remote control function of the remote control ECU 212 is not used during the autonomous driving, the remote control ECU 212 can be kept in a power saving state. The power saving state includes a state in which the power of the remote control ECU 212 is OFF, and a state in which the remote control ECU 212 is in a sleep state. As long as power saving can be realized, the power saving state may include a state in which an internal calculation module such as a central processing unit (CPU) or a graphics processing unit (GPU) that does not execute calculation is OFF.

The remote control on the vehicle 20 is performed by the remote control ECU 212 in response to an instruction from the remote operator 36. Specifically, the remote operator 36 and the remote control ECU 212 communicate with each other, and the remote control ECU 212 operates the vehicle 20 in response to an instruction received from the remote operator 36. Since the autonomous driving function of the autonomous driving ECU 211 is not used during the remote control, the autonomous driving ECU 211 may be brought into a power saving state as one idea to reduce power consumption. When the autonomous driving ECU 211 is brought into the power saving state during the remote control, however, determination cannot be made as to whether the autonomous driving can be performed. Therefore, transition cannot be made from the remote control to the autonomous driving. This problem will be described in detail below.

The following are examples of elements for the determination of whether the autonomous driving can be performed.
Element A: Traveling Environment Conditions Outside Vehicle Specific examples of this determination element include the fact that the autonomous driving cannot be performed because a map is not prepared, and the fact that the autonomous driving cannot be performed because terrain and traffic rules may be changed due to construction work.
Element B: Conditions of Hardware Including Sensors Specific examples of this determination element include the fact that sensors necessary for the autonomous driving do not operate due to dirt, the fact that a camera necessary for the autonomous driving cannot be used due to inappropriate brightness, and the fact that light detection and ranging (LiDAR) necessary for the autonomous driving cannot be used due to rain or fog. Specific examples of this determination element also include the fact that the self-position cannot be estimated because a global positioning system (GPS) receiver cannot receive a satellite signal.
Element C: Other Hardware and Software Conditions Specific examples of this determination element include the fact that the autonomous driving cannot be performed due to damage, thermal runaway, and hang of hardware necessary for the autonomous driving, and the fact that the autonomous driving cannot be performed due to software abnormalities.
Element D: Adaptability of Autonomous Driving to Current Situation A vehicle capable of fully autonomous driving at Level 5 may be adaptable to all situations. In an autonomous driving vehicle at Level 4 or lower and even the autonomous driving vehicle at Level 5, however, there is a possibility that determination cannot be made as to whether the autonomous driving can be performed unless calculations are actually performed on the spot.

As described above, the elements for the determination of whether the autonomous driving can be performed include not only Element A by which the determination can uniquely be made based on an external factor, but also Element D by which the determination cannot be made unless the autonomous driving ECU 211 is actually operated.

In the vehicle 20 including the autonomous driving ECU 211 and the remote control ECU 212, it is desirable that the autonomous driving ECU 211 control the vehicle as continuously as possible in consideration of labor costs necessary for the remote control. When determination is made that the autonomous driving cannot be continued, the autonomous driving ECU 211 may call the remote control ECU 212 even if the remote control ECU 212 is in the power saving state. Therefore, transition can be made from the autonomous driving to the remote control even if the remote control ECU 212 is in the power saving state during the autonomous driving.

As described above, the elements for the determination of whether the autonomous driving can be performed include not only Element A by which the determination can uniquely be made based on an external factor, but also Element D by which the determination cannot be made unless the autonomous driving ECU 211 is actually operated. When the autonomous driving ECU 211 is in the power saving state during the remote control, determination cannot be made as to whether the autonomous driving can be performed. The remote operator 36 may switch the remote control to the autonomous driving, but the remote operator 36 does not know a timing when the autonomous driving ECU 211 can operate. Therefore, transition cannot be made to the autonomous driving, and the execution period of the remote control increases.

As demonstrated by the operation states of the autonomous driving ECU 211 and the remote control ECU 212 in FIG. 2, the autonomous driving device 21 brings the remote control ECU 212 into the power saving state during the autonomous driving, and keeps the autonomous driving ECU 211 activated in parallel during the remote control. That is, the autonomous driving ECU 211 is operated continuously, and the remote control ECU 212 is operated only in response to a call from the autonomous driving ECU 211. Thus, it is possible to realize power saving and labor cost reduction by reducing the power consumption of the ECU.

3. CONFIGURATION OF AUTONOMOUS DRIVING DEVICE

Figure 3:
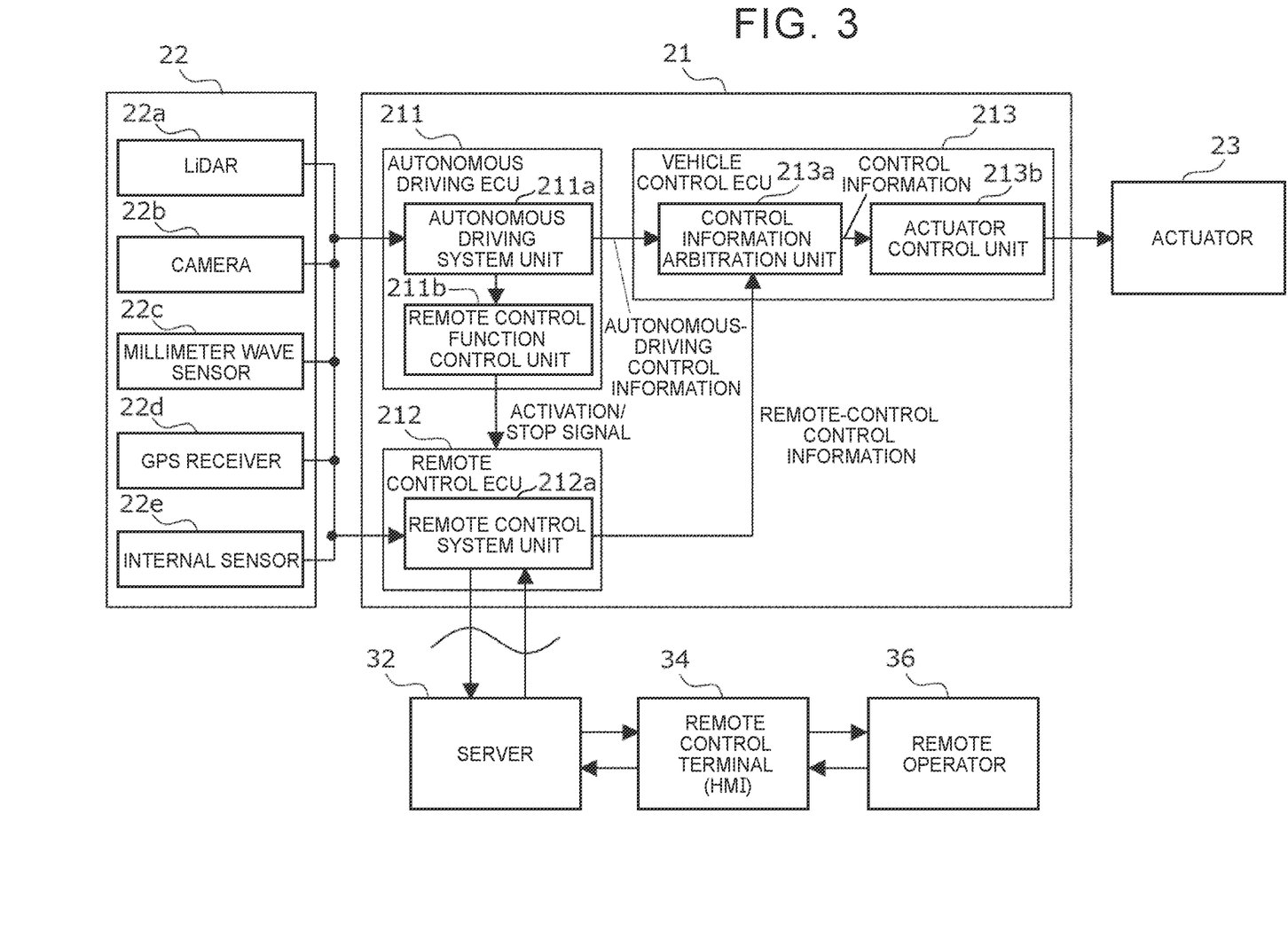
FIG. 3 is a block diagram illustrating an example of a configuration of the autonomous driving device according to the embodiment of the present disclosure.

Referring to FIG. 3, description is given of the autonomous driving device 21 capable of realizing the operation states of the autonomous driving ECU 211 and the remote control ECU 212 in FIG. 2. FIG. 3 is a block diagram illustrating an example of a configuration of the autonomous driving device 21.

A sensor unit 22 is connected to the autonomous driving device 21 by using an in-vehicle network such as a controller area network (CAN). The sensor unit 22 includes a LiDAR sensor 22a, a camera 22b, and a millimeter wave sensor 22c as recognition sensors for recognizing conditions around the vehicle 20. The camera 22b may be shared by the autonomous driving and the remote control, or different cameras may be provided for the autonomous driving and the remote control. The sensor unit 22 further includes a global positioning system (GPS) receiver 22d as a position sensor for detecting the position and orientation of the vehicle 20. The sensor unit 22 further includes an internal sensor 22e. The internal sensor 22e includes a condition sensor that acquires information about motion of the vehicle 20. Examples of the condition sensor include a wheel speed sensor, an acceleration sensor, an angular velocity sensor, and a steering angle sensor.

An actuator 23 is connected to the autonomous driving device 21 by using the in-vehicle network such as the CAN. The actuator 23 includes a steering device for steering the vehicle 20, a driving device for driving the vehicle 20, and a braking device for braking the vehicle 20. Examples of the steering device include a power steering system, a steer-by-wire steering system, and a rear wheel steering system. Examples of the driving device include an engine, an EV system, and a hybrid system. Examples of the braking device include a hydraulic brake and a regenerative brake. The actuator 23 also includes devices such as a turn signal and a wiper that need to operate for safe traveling of the vehicle 20. The actuator 23 operates in response to a control signal transmitted from the autonomous driving device 21.

The autonomous driving device 21 includes the autonomous driving ECU 211, the remote control ECU 212, and a vehicle control ECU 213 that is a third ECU. The ECUs 211, 212, and 213 are connected by using the in-vehicle network such as the CAN. Each of the ECUs 211, 212, and 213 includes a processor and a memory coupled to the processor. The memory stores one or more programs executable by the processor and various types of information related to the programs. When the processor executes the programs, various processes are realized by the processor. The memory includes a main storage device and an auxiliary storage device. The auxiliary storage device includes various databases including a map database.

The autonomous driving ECU 211 includes an autonomous driving system unit 211a and a remote control function control unit 211b. These units are implemented as functions of the autonomous driving ECU 211 when the processor executes the programs stored in the memory of the autonomous driving ECU 211.

The autonomous driving system unit 211a determines whether the autonomous driving can be performed based on various types of detection information from the sensor unit 22 and, if necessary, information acquired from various databases in the storage device. The elements for the determination are described above. When the autonomous driving can be performed, the autonomous driving system unit 211a generates control information for autonomous driving (hereinafter referred to as "autonomous-driving control information"). The autonomous driving system unit 211a transmits, to the remote control function control unit 211b, a signal associated with a result of the determination of whether the autonomous driving can be performed.

A predetermined method can be used to generate the autonomous-driving control information. An example of the method will be described below. First, the position of the vehicle 20 on a map is recognized based on position information of the vehicle 20 that is received by the GPS receiver 22d, information about motion of the vehicle 20 that is detected by the internal sensor 22e, and map information acquired from the map database. Pieces of detection information are acquired from the LiDAR sensor 22a, the camera 22b, and the millimeter wave sensor 22c. Objects around the vehicle 20 are recognized by using a technique such as pattern matching or deep learning, and the positions and types of the objects are determined. The objects whose positions and types are determined are output as targets. Next, a travel plan of the vehicle 20 is created based on a route and target information recorded in the map database. The travel plan is created so that the vehicle 20 travels appropriately on the route in light of references such as safety, legal compliance, and travel efficiency.

The autonomous driving system unit 211a generates a target trajectory based on the created travel plan. The target trajectory includes a set of target positions of the vehicle 20 in a coordinate system fixed to the vehicle 20 and a target speed at each target point. The autonomous driving system unit 211a outputs the generated target trajectory as the autonomous-driving control information. As another example, the autonomous driving system unit 211a may calculate an actuator control amount (for example, a steering angle and a pedal depression amount) for causing the vehicle 20 to travel along the target trajectory, and output the actuator control amount as the autonomous-driving control information. As still another example, a space where the vehicle 20 is allowed to travel may be created based on the travel plan, and the space may be output as the autonomous-driving control information. When the travel plan includes a lane change or a right or left turn at an intersection, an ON/OFF operation of the turn signal may be included in the autonomous-driving control information.

The remote control function control unit 211b transmits an activation signal or a stop signal to the remote control ECU 212 based on a signal from the autonomous driving system unit 211a. Specifically, when the autonomous driving can be performed, the remote control function control unit 211b transmits the stop signal to the remote control ECU 212 to bring the remote control ECU 212 into the power saving state. When the autonomous driving cannot be performed, the remote control function control unit 211b transmits the activation signal to the remote control ECU 212 to activate the remote control ECU 212.

The remote control ECU 212 includes a remote control system unit 212a. The remote control system unit 212a is implemented as a function of the remote control ECU 212 when the processor executes the programs stored in the memory of the remote control ECU 212. The programs stored in the memory of the remote control ECU 212 constitute a program set for causing the autonomous driving device 21 to exert functions together with the programs stored in the memory of the autonomous driving ECU 211.

The remote control system unit 212a communicates with the server 32, and transmits information necessary for the remote control to the server 32. The information transmitted to the server 32 includes various types of detection information from the sensor unit 22, including an image acquired by the camera 22b, and information acquired from various databases in the storage device if necessary. When information acquired from the outside of the remote control system 100, such as road traffic information acquired from a road traffic information system, is useful for the remote control, the information may be included in the transmission information. The information transmitted from the remote control system unit 212a to the server 32 is processed by the server 32 and transmitted to the remote control terminal 34.

The remote control system unit 212a communicates with the server 32, and receives a remote control signal for the remote control from the server 32. The remote control signal is input to the remote control terminal 34 by the remote control operator 36. When the remote driving is performed, the remote control signal is, for example, a remote driving signal generated through a steering operation or a pedaling operation. When the remote assistance is performed, the remote control signal is, for example, a remote assistance signal generated through an operation on a button or lever.

The remote control system unit 212a generates control information for remote control (hereinafter referred to as "remote-control control information") based on the remote control signal received from the server 32. The remote-control control information may be any information as long as the vehicle 20 can be controlled. For example, the actuator control amount may be generated as the remote-control control information. For example, when there is no problem of interruption or delay in communication, an hourly control amount may be generated as the remote-control control information. To provide robustness against the interruption or delay in communication, a future control amount expected from a current control amount may be added to the hourly control amount. For example, information on the space where the vehicle 20 is allowed to travel may be added. The function for securing the robustness against the interruption or delay in communication may be provided to the vehicle control ECU 213 described later.

The vehicle control ECU 213 includes a control information arbitration unit 213a and an actuator control unit 213b. These units are implemented as functions of the vehicle control ECU 213 when the processor executes the programs stored in the memory of the vehicle control ECU 213.

The control information arbitration unit 213a arbitrates the autonomous-driving control information transmitted from the autonomous driving system unit 211a and the remote-control control information transmitted from the remote control system unit 212a. The following are examples of roles and methods of arbitration by the control information arbitration unit 213a.

Arbitration Method 1: Method of Adopting Only One Piece of Control Information

Since the remote control ECU 212 is activated or stopped depending on whether the autonomous driving can be performed, only one piece of control information is input. In a system where time synchronization is not guaranteed, however, the two pieces of control information may be input. When the autonomous driving can be performed, only the autonomous-driving control information is adopted and the remote-control control information is rejected. As a result, time synchronization is guaranteed by the control information arbitration unit 213a.

Arbitration Method 2: Method of Adopting Only One Piece of Control Information and Smoothly Switching Control Information in Transition When the control information is quickly switched in the transition from the autonomous driving to the remote control or from the remote control to the autonomous driving, the behavior of the vehicle 20 may become unstable at the time of switching, which may cause discomfort to occupants. For example, when an instruction to depress the accelerator pedal is given in the autonomous driving and an instruction to release the accelerator pedal is given in the remote control, sudden deceleration occurs in the transition from the autonomous driving to the remote control, and sudden acceleration occurs in the transition from the remote control to the autonomous driving. Therefore, calculation is performed to smoothly switch the control information in these transitions.

The control information arbitrated by the control information arbitration unit 213a is transmitted to the actuator control unit 213b in a subsequent stage. The actuator control unit 213b calculates the actuator control amount of the actuator 23 based on the control information transmitted from the control information arbitration unit 213a. Then, the actuator control unit 213b controls the actuator 23 by the actuator control amount. The description "smoothly switching control information" in Arbitration Method 2 means generation of such control information that the actuator control amount changes smoothly.

4. AUTONOMOUS DRIVING METHOD BY AUTONOMOUS DRIVING DEVICE

Figure 4:
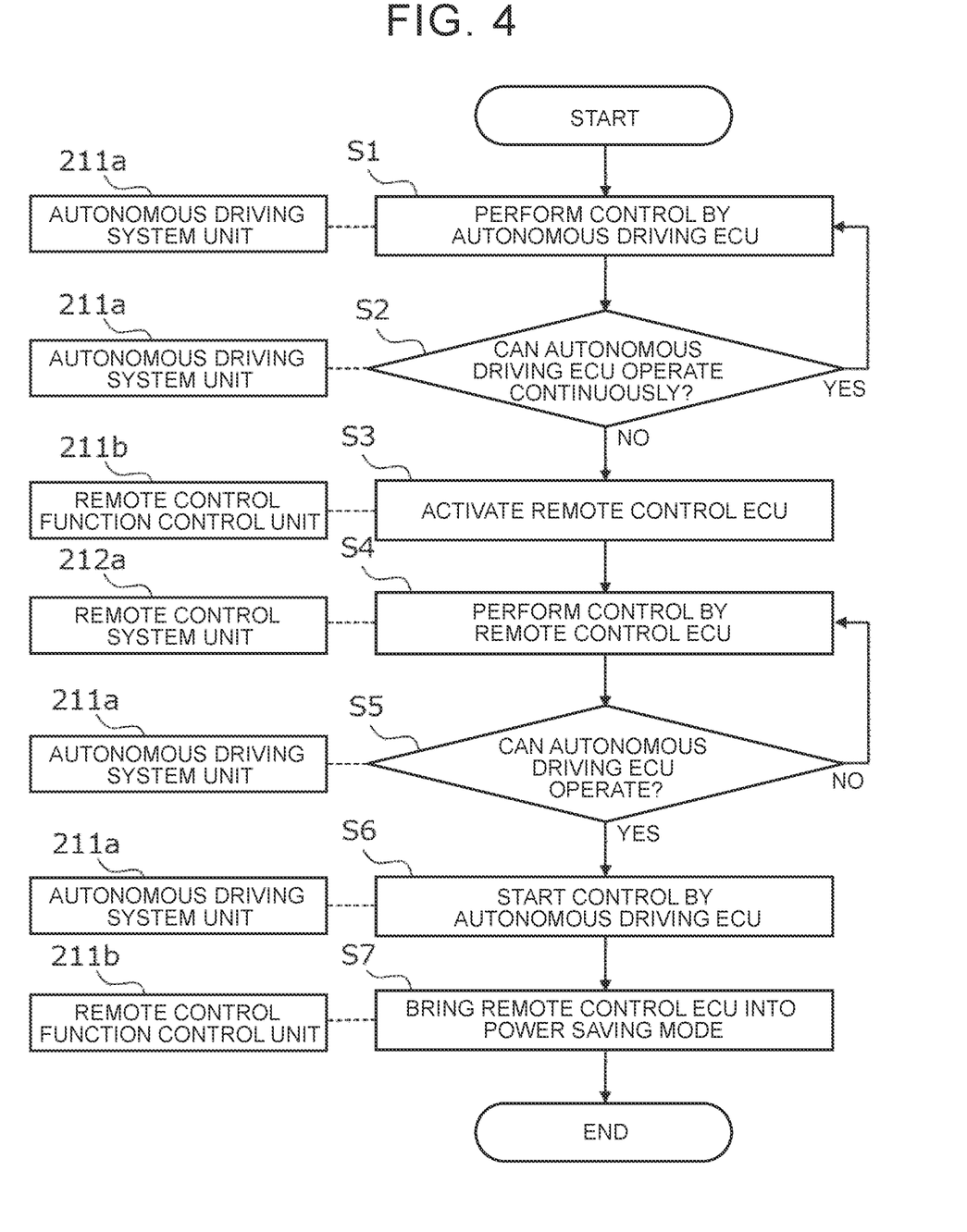
FIG. 4 is a flowchart illustrating an autonomous driving method according to the embodiment of the present disclosure.

An autonomous driving method by the autonomous driving device 21 configured as described above will be described with reference to FIG. 4. FIG. 4 is a flowchart illustrating the autonomous driving method by the autonomous driving device 21. In the flowchart, processing entities are illustrated together with details of processes of individual steps. As an example, the flowchart starts in a state in which the autonomous driving ECU 211 is performing the autonomous driving.

In Step S1, the control by the autonomous driving ECU 211, that is, the autonomous driving is being performed. The entity of this process is the autonomous driving system unit 211a. In Step S2, the autonomous driving system unit 211a determines whether the autonomous driving ECU 211 can operate continuously. In this determination, Determination Elements A to D are taken into consideration. When determination is made that the operation can be continued, the process returns to Step S1 and the control by the autonomous driving ECU 211 is continued.

When determination is made in Step S2 that the operation cannot be continued, the remote control function control unit 211b performs a process of Step S3. In Step S3, the remote control ECU 212 is activated by the remote control function control unit 211b.

In Step S4, the control by the remote control ECU 212, that is, the remote control is performed. The entity of this process is the remote control system unit 212a. In Step S5, the autonomous driving system unit 211a determines whether the autonomous driving ECU 211 can operate. In this determination, Determination Elements A to D are taken into consideration. When determination is made that the operation is not possible, the process returns to Step S4 and the control by the remote control ECU 212 is continued.

When determination is made in Step S5 that the operation is possible, the autonomous driving system unit 211a performs a process of Step S6. In Step S6, the autonomous driving system unit 211a starts the control by the autonomous driving ECU 211. In Step S7, the remote control ECU 212 is brought into a power saving mode by the remote control function control unit 211b.

Figure 5:
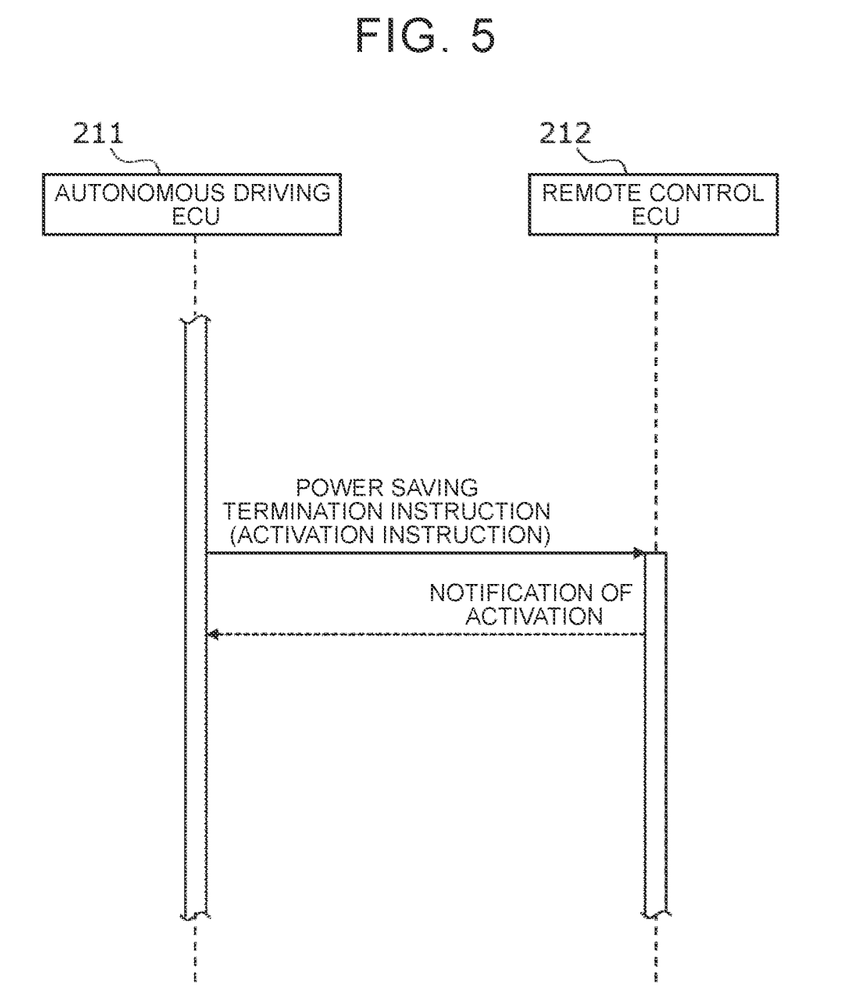
FIG. 5 is a sequence diagram illustrating operations of an autonomous driving ECU and a remote control ECU in transition from autonomous driving to remote control.
Figure 6:
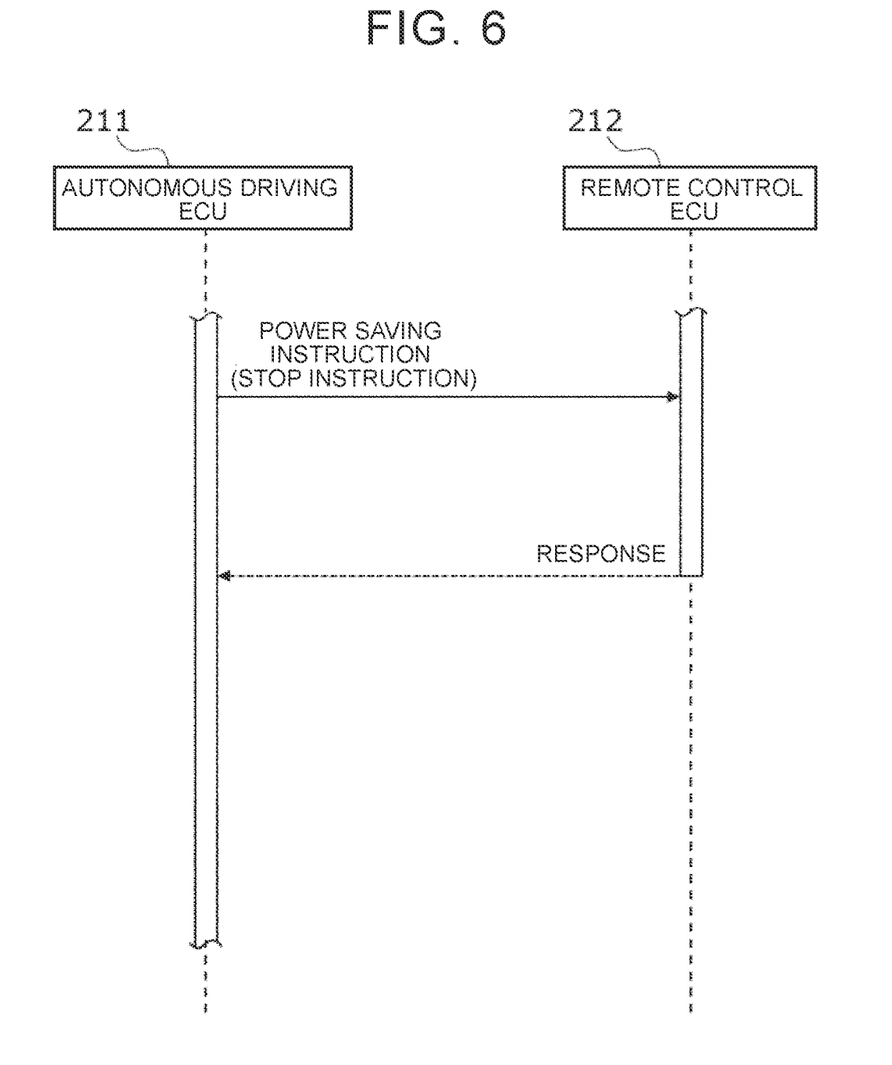
FIG. 6 is a sequence diagram illustrating operations of the autonomous driving ECU and the remote control ECU in transition from the remote control to the autonomous driving.

FIGS. 5 and 6 are sequence diagrams illustrating the autonomous driving method described above. FIG. 5 is a sequence diagram illustrating operations of the autonomous driving ECU 211 and the remote control ECU 212 in the transition from the autonomous driving to the remote control. As illustrated in FIG. 5, in the transition from the autonomous driving to the remote control, a power saving termination instruction, that is, an activation instruction is transmitted from the autonomous driving ECU 211 to the remote control ECU 212. The remote control ECU 212 makes transition from the power saving state to the activated state in response to the power saving termination instruction from the autonomous driving ECU 211. When the transition to the activated state is completed, the remote control ECU 212 notifies the autonomous driving ECU 211 that the remote control ECU 212 has been activated.

FIG. 6 is a sequence diagram illustrating operations of the autonomous driving ECU 211 and the remote control ECU 212 in the transition from the remote control to the autonomous driving. As illustrated in FIG. 6, in the transition from the remote control to the autonomous driving, a power saving instruction, that is, a stop instruction is transmitted from the autonomous driving ECU 211 to the remote control ECU 212. The remote control ECU 212 makes transition from the activated state to the power saving state in response to the power saving instruction from the autonomous driving ECU 211. When the transition is made to the power saving state, a response signal is transmitted from the remote control ECU 212 to the autonomous driving ECU 211.

5. OTHER EMBODIMENTS

In the embodiment described above, the determination of whether the autonomous driving can be performed is made based on Determination Elements A to D. These are elements by which determination is made as to whether the calculation for the autonomous driving is possible, but some constraints may be imposed on the transition conditions from the autonomous driving to the remote control. The following are examples of constraints in the transition. When the autonomous driving system unit 211a determines whether the autonomous driving can be performed, pieces of information on Constraints 1 to 3 may be used in addition to Determination Elements A to D.
Constraint 1: The speed must be zero in the transition.
Constraint 2: The steering angle must be returned to neutral in the transition.
Constraint 3: In the transition from the remote control to the autonomous driving, the vehicle 20 must be stopped at a predetermined point such as a bus stop.

In the embodiment described above, the autonomous driving system unit 211a determines whether the autonomous driving can be performed, and generates the autonomous-driving control information when the autonomous driving can be performed. These two functions may be provided separately. That is, an autonomous driving executability determination unit, an autonomous-driving control information generation unit, and the remote control function control unit may be provided as the functions of the autonomous driving ECU 211.

The remote control ECU 212 in the embodiment described above may be provided as a set of a remote assistance ECU for the remote assistance and a remote driving ECU for the remote driving. When the remote assistance is executed, only the remote assistance ECU may be activated while the remote driving ECU is in a power saving state. When the remote driving is executed, the remote driving ECU may be activated while the remote assistance ECU is in a power saving state.

What is claimed is:

1. An autonomous driving device to be mounted on a vehicle, the autonomous driving device comprising:
   a first electronic control unit configured to autonomously drive the vehicle; and
   a second electronic control unit configured to operate the vehicle under remote control from an outside, wherein
   the first electronic control unit is configured to keep an activated state while the second electronic control unit is operating the vehicle, and
   the second electronic control unit is configured to keep a power saving state while the first electronic control unit is autonomously driving the vehicle.

2. The autonomous driving device according to claim 1, wherein the second electronic control unit is configured to:
   make transition from the power saving state to an activated state in response to an activation instruction from the first electronic control unit; and
   make transition from the activated state to the power saving state in response to a power saving instruction from the first electronic control unit.

3. The autonomous driving device according to claim 1, further comprising a third electronic control unit configured to arbitrate control information to be output from the first electronic control unit and control information to be output from the second electronic control unit when the remote control is switched to autonomous driving or the autonomous driving is switched to the remote control.

4. The autonomous driving device according to claim 1, wherein the first electronic control unit and the second electronic control unit are mounted separately.

5. The autonomous driving device according to claim 1, wherein the power saving state includes a state in which power to a respective electronic control unit is off.

6. The autonomous driving device according to claim 1, wherein the activated state includes a state that is different than the power saving state.

7. An autonomous driving method for autonomously driving a vehicle by at least two electronic control units, the autonomous driving method comprising:
   autonomously driving the vehicle by a first electronic control unit;
   operating the vehicle under remote control from an outside by a second electronic control unit;
   keeping the first electronic control unit in an activated state while the second electronic control unit is operating the vehicle; and
   keeping the second electronic control unit in a power saving state while the first electronic control unit is autonomously driving the vehicle.

8. The autonomous driving method according to claim 7, further comprising:
   making transition of the second electronic control unit from the power saving state to an activated state in response to an activation instruction from the first electronic control unit; and
   making transition of the second electronic control unit from the activated state to the power saving state in response to a power saving instruction from the first electronic control unit.

9. The autonomous driving method according to claim 7, further comprising arbitrating, by a third electronic control unit, control information to be output from the first electronic control unit and control information to be output from the second electronic control unit when the remote control is switched to autonomous driving or the autonomous driving is switched to the remote control.

10. The autonomous driving method according to claim 7, wherein the first electronic control unit and the second electronic control unit are mounted separately.

11. The autonomous driving method according to claim 7, wherein the power saving state includes a state in which power to a respective electronic control unit is off.

12. The autonomous driving method according to claim 7, wherein the activated state includes a state that is different than the power saving state.

13. A plurality of non-transitory storage media comprising:
- a first non-transitory storage medium storing instructions that are executable by a first electronic control unit mounted on a vehicle and that cause the first electronic control unit to perform a first function; and
- a second non-transitory storage medium storing instructions that are executable by a second electronic control unit mounted on the vehicle and that cause the second electronic control unit to perform a second function, wherein the first function includes autonomously driving the vehicle, and keeping the first electronic control unit in an activated state while the second electronic control unit is operating the vehicle, and the second function includes operating the vehicle under remote control from an outside, and keeping the second electronic control unit in a power saving state while the first electronic control unit is autonomously driving the vehicle.

14. The plurality of non-transitory storage media according to claim 13, wherein:

the first function includes outputting an activation instruction to the second electronic control unit, and outputting a power saving instruction to the second electronic control unit; and the second function includes making transition from the power saving state to an activated state in response to the activation instruction from the first electronic control unit, and making transition from the activated state to the power saving state in response to the power saving instruction from the first electronic control unit.

15. The plurality of non-transitory storage media according to claim 13, further comprising a third non-transitory storage medium storing instructions that are executable by a third electronic control unit and that cause the third electronic control unit to arbitrate control information to be output from the first electronic control unit and control information to be output from the second electronic control unit when the remote control is switched to autonomous driving or the autonomous driving is switched to the remote control.

16. The plurality of non-transitory storage media according to claim 13, wherein the first electronic control unit and the second electronic control unit are mounted separately.

17. The plurality of non-transitory storage media according to claim 13, wherein the power saving state includes a state in which power to a respective electronic control unit is off.

18. The plurality of non-transitory storage media according to claim 13, wherein the activated state includes a state that is different than the power saving state.

* * * * *